United States Patent
Clarke

Patent Number: 5,842,762
Date of Patent: Dec. 1, 1998

[54] INTERLACED IMAGE PROJECTION APPARATUS

[75] Inventor: John A. Clarke, Carshalton, England

[73] Assignee: U.S. Philips Corporation

[21] Appl. No.: 813,417

[22] Filed: Mar. 10, 1997

[30] Foreign Application Priority Data

Mar. 9, 1996 [GB] United Kingdom .................... 9605056

[51] Int. Cl.⁶ .................................................. G03B 21/14
[52] U.S. Cl. ........................... 353/122; 353/20; 348/767; 359/495
[58] Field of Search .................... 353/31, 38, 46, 353/48, 20, 122; 349/5; 348/752, 762, 767, 793; 359/495

[56] References Cited

U.S. PATENT DOCUMENTS

| | | | |
|---|---|---|---|
| 5,098,184 | 3/1992 | Van Den Brandt et al. | 353/102 |
| 5,184,248 | 2/1993 | De Vaan et al. | 359/483 |
| 5,463,434 | 10/1995 | Kanayama et al. | 353/94 |
| 5,537,256 | 7/1996 | Fergason | 348/767 |
| 5,601,351 | 2/1997 | Van Den Brandt | 353/20 |
| 5,612,797 | 3/1997 | Clarke | 349/5 |
| 5,626,408 | 5/1997 | Heynderickx et al. | 353/20 |
| 5,626,411 | 5/1997 | Takahasshi et al. | 353/69 |
| 5,727,860 | 3/1998 | Broer et al. | 353/20 |

FOREIGN PATENT DOCUMENTS

2611389 9/1988 France ........................... G02F 1/135

OTHER PUBLICATIONS

"A Practical Wobbling Device using Ferroelectric Liquid Crystals for Realizing High Resolution Projectors", by A Yasuda et al., AISA Display '95, pp. 79–82.

Primary Examiner—William Dowling
Attorney, Agent, or Firm—F. Brice Faller

[57] ABSTRACT

An image projection apparatus comprises an illumination unit (10), an image display unit (20), comprising a matrix display panel (22) having a row and column array of pixels (25), a projection lens (40) for projecting range produced by the display panel on to a screen (50) and an optical deflection unit (30) arranged between the display unit and the projection lens which is operable selectively to shift the light rays from a row of pixels passing therethrough whereby the pixel row images on the screen in one field are displaced and interlaced with the pixel row images of a preceding field. The image display unit (20) includes an array of lens elements (60) overlying the array of pixels whose effect is to reduce the height of the image of each pixel row in the projected display so the pixel row images of one field can fill the gaps between adjacent pixel row images of a preceding field without any substantial overlap and display panels having high aperture ratio can be utilised.

11 Claims, 5 Drawing Sheets

INTERLACED IMAGE PROJECTION APPARATUS

BACKGROUND OF THE INVENTION

The present invention relates to an image projection apparatus comprising an illumination unit, an image display unit having at least one image display panel comprising an array of pixels arranged in rows and columns and operable to produce a display image, a projection lens for projecting the image produced by the display unit on to a projection screen and an optical deflection unit arranged between the display unit and the projection lens, and which switches between two modes in which the light rays from a row of pixels of the display panel and passing through the deflection unit are shifted relative to one another so as to displace the projected image of the row of pixels on the projection screen.

Such apparatus may be used for large area display of a broadcasted video programme, or an image signal from a storage medium, for example an optical disc or a computer medium. The image display panel used in such apparatus may be a matrix LCD panel, consisting of a layer of liquid crystal material sandwiched between two substrates and preceded by a polarizer and succeeded by an analyser. This panel comprises a large number of pixels, or picture elements, arranged in rows and columns and addressed by a system of row and column electrodes carried on one or both of the substrates through which drive signals are supplied to the pixels. The matrix LCD panel may be of the active type, which means that for each individual pixel a switching device, typically a thin film transistor (TFT) or a thin film diode (TFD) is provided.

In conventional projection apparatus, the number of pixel rows in the image display panel, or three such panels in the case of the image generating unit having three colour channels for red, green and blue, should correspond to the number of image lines in the supplied video signal to ensure that all image information is utilised in producing the viewed display. In a standard TV signal each frame consists of two interlaced fields transmitted sequentially, each comprising half the total number of display lines. The information for all the odd numbered lines is transmitted and then the information for all the even numbered lines. In a matrix LC display panel the pixel rows each display the information of a video line and all pixel rows, odd and even, are continuously illuminated so light passes through the pixels in the even rows during the time when only odd rows information is available, and vice versa. Because each pixel of the panel passes light at each moment, old image information is interwoven between the most recent image information which leads to display artefacts in a picture with fast moving parts. Various ways have been devised to mitigate the artefacts. For example, during each field period when new information is provided for only half of the pixel rows, the adjacent rows may be provided with the same information. However, this results in a decrease of picture contrast and resolution.

A liquid crystal video projector is disclosed in the paper entitled "A practical wobbling device using Ferro-Electric Liquid Crystals for realising high resolution projectors" by A. Yasuda et al in: "Asia Display 1995", pages 79–82, wherein the odd field of a picture frame is displayed by the same pixel rows as the even field. To that end the projector comprises a so-called wobbling device serving as an electro-optic deflection unit. This device is arranged between the LC panel and the projection lens, and consists of a segmented polarisation switch and a birefringent plate. The polarisation switch, comprising a ferroelectric liquid crystal panel, is drivable to rotate the plane of polarisation of the light from the display panel through ninety degrees and the birefringent plate changes the propagating direction of the light rays depending on the orientation of the plane of polarisation. The driving signal for the wobbling device is synchronised with an interlaced image signal, which contains two fields for each picture frame and, for example 25 or 30 frames per second. The picture lines in the projected display corresponding to the second field are shifted to the areas between the pixel rows, producing interlaced images, and the number of displayed horizontal lines appears to be doubled. In this way, for displaying a standard TV-signal, NTSC or PAL, a display panel can be used that has a number of pixel rows half that of a conventional display. On the other hand a High Definition picture, with for example 1148 horizontal lines, can be displayed by a panel having only 574 pixel rows and originally intended for displaying a standard TV signal. Such a projection apparatus has the further advantage that even numbered lines are not displayed when only the odd-numbered line information is available, and vice versa. However, the display lines in the projected display overlap one another to a significant extent when using a standard LC display panel and this overlap substantially impairs the quality of the displayed image. In the most common kind of LC matrix display panels the space between adjacent rows of pixels, which is occupied by opaque material (black matrix), is significantly less than the height of the open part of the pixels, i.e. their dimension in the vertical, column direction, which determines the width of a display line in the projected image. Thus, in one field, the projected display image consists of display lines of a certain width separated by intervening bands of smaller width. In the next field, the display lines produced occupy these intervening bands but necessarily overlap parts of the adjacent pairs of display lines from the preceding field. The overlapping of display lines causes undesirable display effects, particularly reduced vertical resolution and a loss of contrast. There is conflict also with increasing the aperture ratio in order to maximise light throughput. If the opaque area between adjacent pixel rows in the panel is reduced the problem of display line overlap is aggravated. Possibly, to reduce such overlap a non-standard LC panel could be used in which the width of the opaque area between adjacent pixel rows is increased as to become approximately the same as the pixel height but the aperture ratio of the panel (i.e the ratio of the sum of the pixel open areas to the area of the pixel array) would then be severely affected with approximately half the light incident on the panel being lost, consequently resulting in a corresponding reduction in display brightness.

SUMMARY OF THE INVENTION

It is an object of the present invention to provide an improved image projection apparatus using such an interlace technique.

According to the present invention, an image projection apparatus of the kind described in the opening paragraph is characterised in that the image display unit includes an array of lens elements overlying the array of pixels which lens elements are of such a form and arranged with respect to the pixel rows so as to reduce the height of the image of each pixel row in the projected display image. The invention overcomes the aforementioned problem in the above-described image kind of projection apparatus using an optical interlace technique. By virtue of the lens elements, the undesirable effect of line overlap is reduced or even eliminated by the array of lens elements. The effect of the lens elements is to decrease the height of the display lines produced. This height reduction is relative to the centre to centre spacing of the display lines, i.e. pixel row images, in the projected display. Consequently there is a corresponding increase in the height of the intervening gap thereby enabling the display lines in successive fields to be interlaced with at least reduced overlap. At the same time, and importantly, large aperture ratios can be employed in the display panel to maximise light throughput, and conventional kinds of display panels, using comparatively small width opaque areas between adjacent pixel rows, can be used.

Preferably, the lens elements are operable to reduce the height of a projected pixel row image such that it is approximately half the centre to centre spacing between the images of adjacent pixel rows in the projected display image (in one field). The display lines in the projected display image formed in one field, by a row of pixels, will thus substantially fill the gaps between respective adjacent display lines in the projected display image formed in the preceding field with little or no overlap. However, a lesser reduction in the pixel row image, leading to a reduction in the extent of overlap, would still be of some benefit.

In a preferred embodiment, the lens elements comprise parallel, elongate, lens elements, extending in the pixel row direction, each lens element overlying a respective pixel row. Such a lens element array is cheaper and simpler to produce than an array having an individual lens element for each pixel. The elongate lens elements may have a profile which is part of a circle or other smooth curve, or which is composed of straight lines. An array of such lens elements can be provided easily in the form of a moulded plastics lenticular sheet.

For optimum effect the lens elements are preferably positioned close to the plane of the pixels in the panel in order to avoid light cross-talk problems. With the display panel comprising a light modulating matrix display panel, operating in transmissive mode, the array of lens elements may be arranged optically preceding or succeeding the pixels. In a preferred embodiment, using an LC display panel, although it is envisaged that a kind of electro-optical matrix display panel other than LC could be used, the array of lens elements, provided for example as a moulded plastics lenticular sheet, is disposed adjacent to, and preferably directly over, the outer surface of a substrate of the display panel. The lens element array may be disposed over the substrate at the output side of the panel, in which case the lens elements would each comprise a negative lens element, and form a reduced height virtual image of their associated pixels, or disposed over the substrate at the input side of the panel, in which case the lens elements would each comprise a positive lens element whose action would be to concentrate light into a central region of the open area of their associated pixels. In the latter case, problems due to light from a pixel possibly going to the "wrong" lens element, thereby creating a confused image, are avoided.

Alternative forms of lens elements are possible. For example, the lens elements could be formed as gradient index lenses in the glass substrate of the display panel or by using a sandwich of materials with substantially different refractive indices for the substrate. The use of a lenticular sheet is considered, however, to be simpler.

In producing a reduced height of display line, whether it be by using a negative lens element to produce a reduced height virtual image of the row of pixels, or by using a positive lens element to concentrate light through a central region of the pixels, the effect of the lens elements is to increase the divergence of the light. The increased angle of the light is inversely proportional to the magnification ratio. In order to collect and utilise most of this light, the projection lens will need to have an adequate aperture. This, however, is easily achieved.

For a colour display, the apparatus may comprise a plurality of image display units, each operating with a different colour light, whose outputs are combined before being projected by the projection lens, each of which display units includes a said array of lens elements.

Embodiments of image projection display apparatus in accordance with the invention will now be described, by way of example, with reference to the accompanying drawings, in which:

BRIEF DESCRIPTION OF THE DRAWINGS

It will be appreciated that the Figures are merely schematic and are not drawn to scale. In particular certain dimensions may have been exaggerated while others have been reduced. Also, the same reference numerals are used throughout the Figures to denote the same or similar parts.

DETAILED DESCRIPTION OF THE PREFERRED EMBODIMENTS

Figure 1:
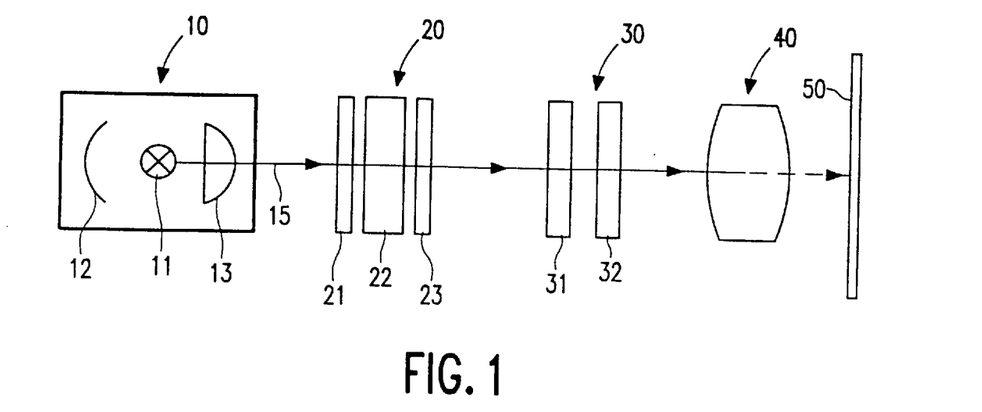
FIG. 1 is a schematic view of one embodiment of the image projection display apparatus showing its main components.

Referring to FIG. 1, the image projection apparatus comprises an illumination unit 10 providing a projection light beam 15, here represented by its axis, an image display unit 20 for generating an image, an optical deflection unit 30 for shifting the beam, and a projection lens 40 for projecting the image onto a projection screen 50.

The illumination unit 10 comprises a lamp 11, for example a ultra high pressure mercury lamp, a reflector 12 and a condenser lens 13 producing a collimated beam. The unit 10 may also comprise integrator plates to produce a projection beam having uniform intensity and a cross-section adapted to the display panel to be illuminated, examples of which are disclosed in U.S. Pat. No. 5,098,184 and in U.S. Pat. No. 5,184,248.

The image display unit 20 is represented by a single, spatial light modulating liquid crystal display panel 22, preferably a twisted nematic liquid crystalline active matrix panel of the TFT or thin film diode kind. The panel is of conventional form comprising a matrix array of m rows and n columns of pixels (i.e. display elements). For colour display, the panel 22 can be a colour panel having a colour micro-filter array aligned with the pixels and forming triplets of red, green and blue pixels. Alternatively, the unit 20 may comprise a colour separating system, three display panels for the primary colours red, green and blue and a colour recombination system, as is well known in the art. The rows of pixels in the panel 22 are driven, according to an applied video signal, in conventional manner one at a time in sequence from the first row, row 1, to the last row, row m, such that all rows are driven in a field period $T_f$ corresponding to the field period of the applied video signal. The video signal is of an interlaced type in which odd and even video lines are presented in odd and even field periods respectively. In two successive, odd and even, fields periods, therefore, the rows of pixels are addressed to display odd and even display lines with each row of pixels displaying firstly an odd line and then an even line. Assuming that the number of pixel rows, m, corresponds to the number of odd, or even, lines in the video signal, then it will be appreciated that the m odd lines and m even lines of the video signal are displayed by the m pixel rows over two field periods, i.e. one frame period.

The units 10, 20 and 30 are accommodated in a housing and the projection screen 50 may be a rear projection screen also accommodated in the housing or a free standing screen or a screen fixed to a wall.

Figure 2:
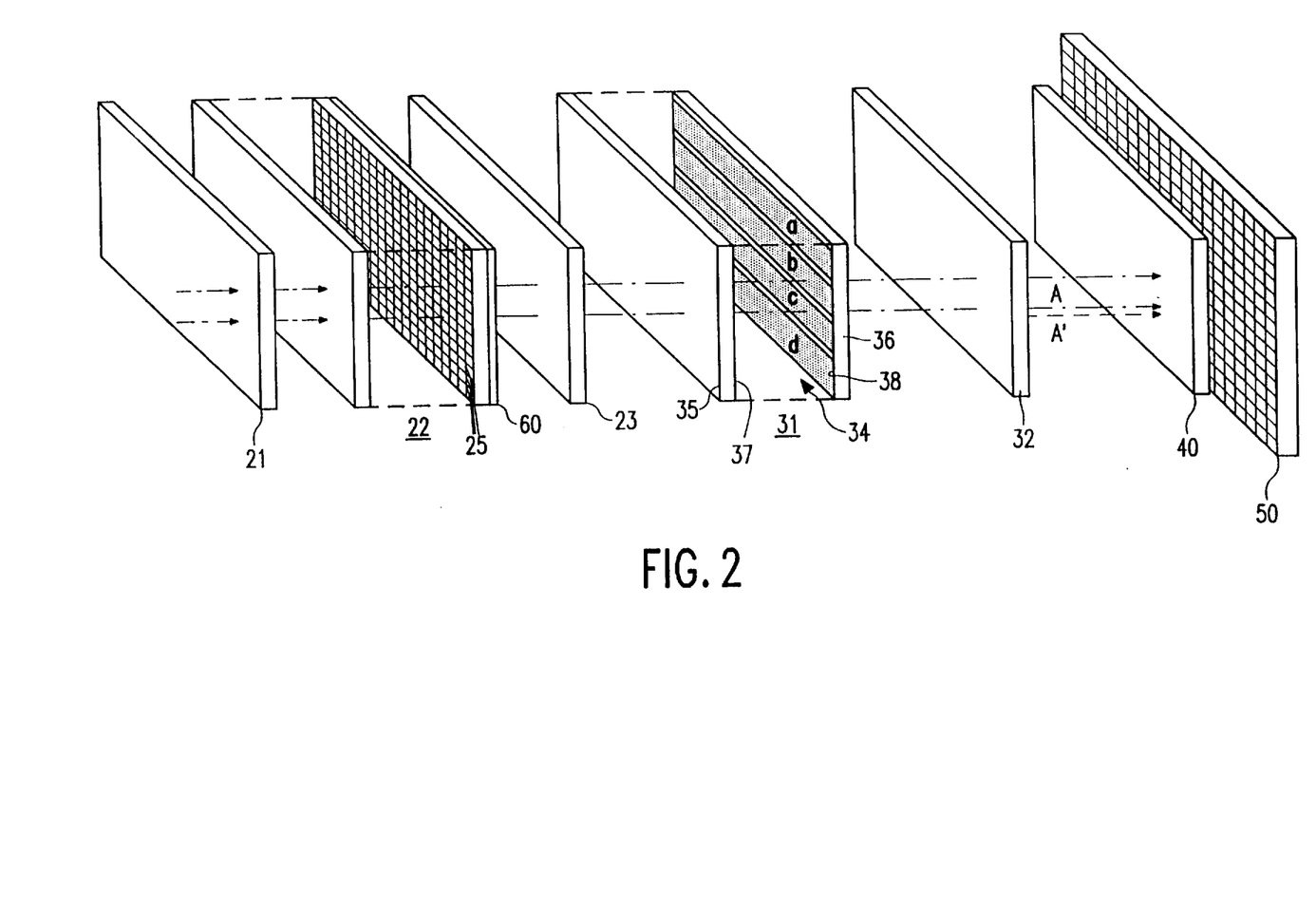
FIG. 2 is a perspective view showing part of the apparatus of FIG. 1 in greater detail.
Figure 3A:
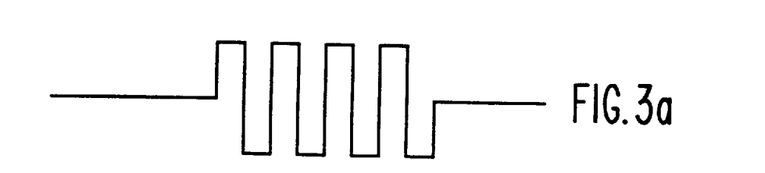
FIG. 3 shows example drive waveforms applied to a component of the apparatus.
Figure 3B:
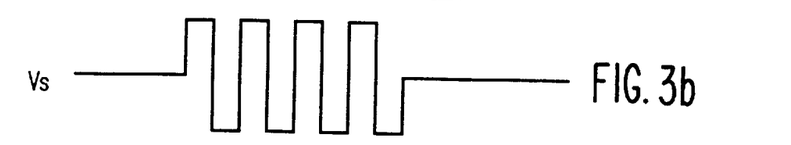
Figure 3C:
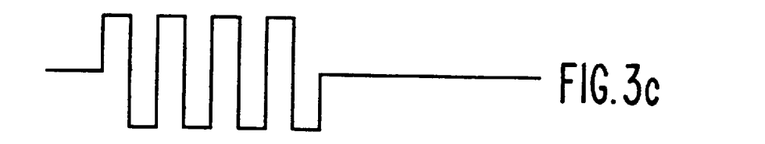
Figure 3D:
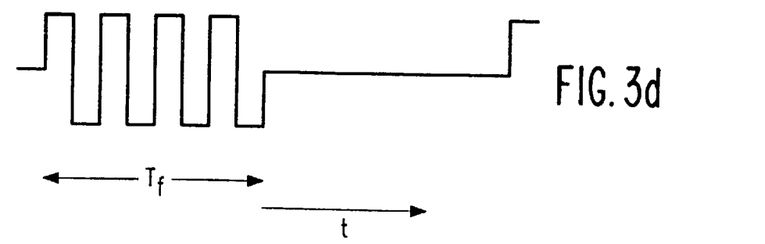

In a conventional projection apparatus using a matrix display panel the number of pixel rows in the display panel should be equal, or close, to the total number of image lines from both fields in the video signal received by the apparatus. However, there are problems with fabricating such a panel and achieving a reasonable aperture ratio, particularly if the panel is to be used for displaying a high-definition video signal. With the apparatus of FIG. 1 certain of these problems are overcome by means of the optical deflection unit 30. Part of the apparatus including the optical deflection unit is shown in greater detail in the perspective view of FIG. 2. The direction of the projection light is from left to right. The pixels of the panel, arrayed in rows and columns, are indicated by the rectangular blocks 25, which represent their open apertures, separated by opaque lines. Only a small number of pixels are shown for simplicity. The optical deflection unit 30 is arranged between the analyser 23 associated with the display panel 22 and the projection screen 50, preferably before the projection lens 40, here shown very schematically. The optical deflection unit 30 comprises a polarisation switching element 31 which, depending on the applied electrical drive signal, either allows light to pass through without alteration to its plane of polarisation or rotates the plane of polarisation of the light passing through it by ninety degrees, and a birefringent element 32 which, depending on the polarisation of the light passing through either does or does not produce a vertical positional shift. The polarisation switching element 31 is constituted by a panel comprising a layer 34 of electro-optical material and an electrode 37 and segmented electrodes 38 on the substrates 35 and 36 respectively between which the layer 34 is sandwiched. The material of the layer 34 is for example a liquid crystalline material such as a ferro-electric liquid crystal material. The electrode 38 is divided into a number of strip-electrodes extending parallel to the pixel row direction of the panel 22. If the light from each pixel row of the display panel were to be individually deflected, a complex electrode structure and a large number of drive circuits would be needed. Therefore it is preferred that the electrode 38 is divided into a small number of strip-electrodes 38a–38d, each of which is aligned with a respective group of pixel rows of the panel 22, so that the panel 31 comprises a smaller number of horizontal segments, each of which serves to deflect together a number of pixel rows. In the embodiment of FIG. 2 the switching element 31 comprises four horizontal segments, but the number may be increased, for example, to ten.

FIG. 3 shows drive voltage waveforms and relative timings for the four segments, a, b, c and d, of the polarisation switch. $T_f$ is the field period, i.e. half a videoframe period. The segment drive voltages $V_s$ for the succeeding segments a, b, c and d are each shifted by a quarter of the field period relative to the preceding one. The drive voltages consist of short rectangular pulses which are bipolar to eliminate DC voltages and are synchronised with the video signal to be displayed. By applying these voltages to the strip electrodes 38a–38d each of these electrodes is, within each frame time, active during a first time interval and inactive during a second time interval. These first and second time intervals each correspond to the field period and are shifted over a quarter field time for the succeeding segments of the polarisation switch. The result of the operation of the polarisation switch together with the birefringent element is that the light from the pixel rows belonging to a given switch segment, a, b, c or d, is switched by such segment between two positions, as denoted by the lines A and A' in FIG. 2, whereby one of these positions is associated with the even field lines of the displayed image and the other position is associated with the odd field lines.

The birefringent element 32 is a quartz crystal plate. The element provides a transversal shift between the two differently polarised beams from the polarisation switch 31 corresponding to half of the centre-to-centre distance between the pixel rows of the display panel. By arranging the element 32 in the path of the projection light then for one of the polarisation directions, as determined by the polarisation switch 31, the pixel row images formed by the projection lens on the projection screen are displaced relative to the images of the same pixel rows for the other polarisation direction. Seen in the backward direction, from the projection lens to the display panel, the deflection unit, on appropriate switching, causes an apparent lateral displacement in the vertical, column, direction of the pixels. The extent of such displacement is selected, by suitable choice of the shift achieved by the birefringent element 32, so that it is approximately half the centre to centre distance between the pixel rows.

Figure 4:
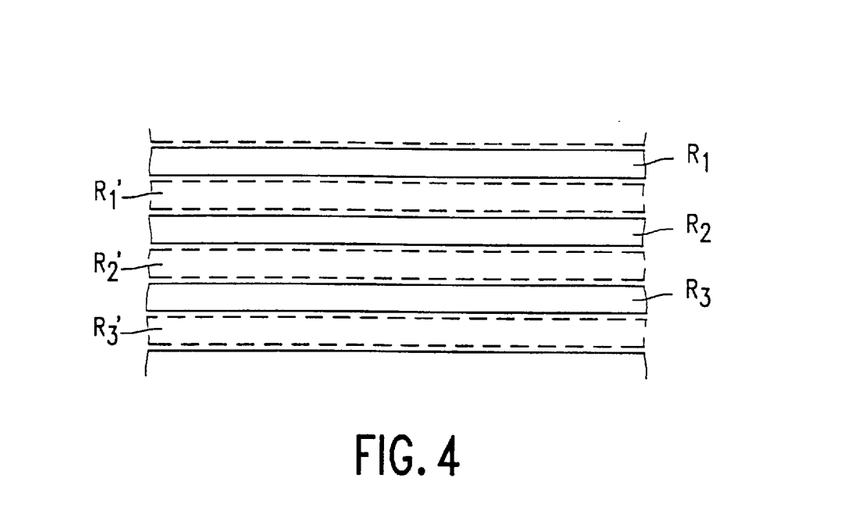
FIG. 4 illustrates a desired form of display line structure to be obtained from the apparatus.

FIG. 4 illustrates schematically an ideal form for a typical part of the projected display image structure to be produced from a few pixel rows belonging to one polarisation switch segment and as would be seen on the projection screen. In this Figure the solid lines represent the apparent positions of projected pixel rows R1, R2 and R3 during a first half frame time (i.e. one field period) and the dotted lines represent the apparent positions of the same projected pixel rows during the second half frame time, here denoted R1', R2' and R3' respectively.

Figure 5:
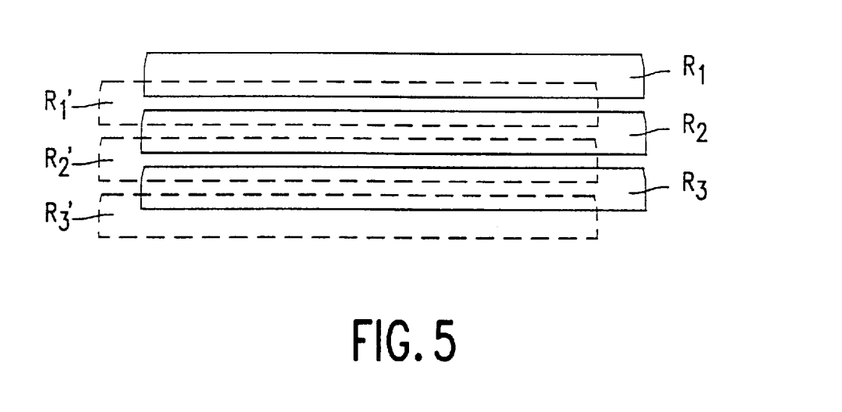
FIG. 5 illustrates a problem with the display line structure which can occur when using optical interlacing.

However, in using a display panel whose pixel layout is of a standard kind providing a high aperture ratio in which adjacent pixel rows are separated by an opaque area whose height is small compared with the pixel open area height then a problem becomes apparent as the row image, for example for an odd line, cannot be accommodated between two adjacent row images for even lines and imperfect interlace occurs. This is illustrated in FIG. 5 which, like FIG. 4, shows the apparent positions of parts of pixel rows R1, R2 and R3 in two successive field periods. As can be seen, the position of the row images in the second field period, R1', R2' and R3' substantially overlap the row positions in the first field period. This results in poor display quality, not least because vertical resolution is severely impaired. If the geometry of the pixel lay-out of the display panel were to be modified such that the height of the opaque area between adjacent rows of pixels is approximately equal to the height of the open area of a row of pixels, then the interlaced pixel row images can be arranged neatly such that one pixel row image of the displaced field fits between two adjacent pixel row images of the undisplaced field. However, the aperture ratio of the panel would then be severely impaired as approximately half of the light incident on the panel would be lost resulting in significantly reduced display brightness.

In the apparatus of FIGS. 1 and 2, the panel 22 is of the kind in which adjacent rows of pixels 25 are separated by comparatively narrow opaque areas so as to maximise light throughput. Associated with the panel 22, there is provided an array of lens elements whose action is to reduce the apparent height of the image of the pixel rows, constituting display lines, in the projected image display. The height reduction is relative to the centre to centre spacing of the display lines, (pixel row images) in the projected display. The gap between adjacent display lines in one field is correspondingly increased. Preferably, the width reduction is such that the odd display lines fill the gaps between the even display lines without any significant overlap. This is achieved by arranging that the height of a pixel row image is reduced such that it is substantially half the centre to centre spacing between adjacent pixel row images. Consequently, a display line structure like that depicted in FIG. 4 is obtained with all the benefits associated with this kind of display panel.

Referring to FIG. 2, the lens element array in this embodiment is disposed on the output side of the panel 22 and indicated at 60. The lens element array could alternatively be positioned at the input side of the panel, as will be described subsequently.

Figure 6:
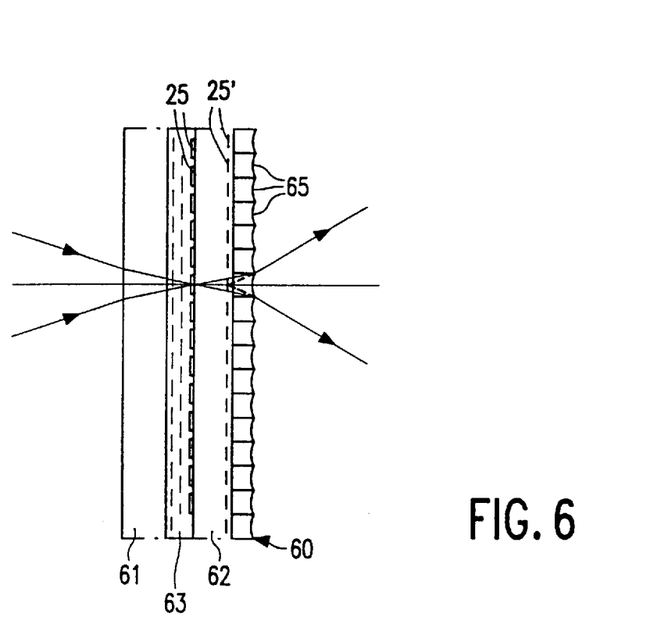
FIGS. 6 and 7 show in side view two embodiments of part of the display unit used in the apparatus of FIG. 1.

FIG. 6 shows schematically a cross-section through a part of the panel 22 and the array 60 in this embodiment. The transparent, glass, substrates of the panel are indicated at 61 and 62, between which liquid crystal material 63 is disposed, and a few pixels in one column of the array, are here depicted at 25. The lens array 60 is preferably arranged close to the plane of the pixels and to this end the lens array is disposed directly on the outer surface of the substrate 62. If the analyser layer 23 were to be carried on this substrate rather than being separated, the lens array could be provided over this layer.

The lens array 60 comprises elongate, parallel, lens elements 65 extending in the pixel row direction, each lens element 65 being similar and comprising a negative cylindrical lens element aligned with and overlying, a respective row of pixels. Other lens profiles, for example, comprising contiguous flat portions, could be used. The array of lens elements can be provided in the form of a lenticular sheet comprising a moulded plastic sheet of microlenses, in known manner, and secured to the substrate by gluing. As indicated by the example light beam paths for a typical pixel shown in FIG. 6, the lens element action is to increase the divergence of the light from a row of pixels (in the column direction) and form a reduced size virtual image, indicated at 25', of the row of pixels. The increased angle of light is inversely proportional to the magnification ratio. In order to maintain display brightness, the projection lens 40 has an adequate aperture to collect this light. A limitation to the effectiveness of the lens elements is the thickness of the substrate 62. Some of the light, especially that which has come through the edges of the pixel open area, may then pass through the "wrong" cylindrical lens element 65, and thus some light will appear in the adjacent pixel. The thicker the substrate the worse this effect will be. If the light which passes through the centre of a pixel is considered with a typical illumination cone of F/3 and a refractive index of 1.55 for the glass, then the maximum thickness of the substrate plus lens element is 4.6 times the spacing of the rows of pixels. With, for example, a proposed 287 lines in each half-frame, the row spacing for a 3:4 (rows to columns) format 2.8 inch diagonal LC panel is 0.15 mm. Thus the allowable substrate thickness is around 0.6 mm with 0.1 mm for the lens element thickness. When the light which passes through the edges of the pixel is also considered, then a reduced substrate thickness would be desirable. Alternatively, the aperture of the input light may be reduced in the vertical plane (i.e. the plane of FIG. 6) and increased in the perpendicular direction to compensate.

Alternatively, the lens elements 65 may be formed as gradient index lenses in the glass substrate 62 itself. The substrate 62 may also comprise a sandwich of materials with substantially different refractive indices, and appropriate profiles, to create the lens elements.

Figure 7:
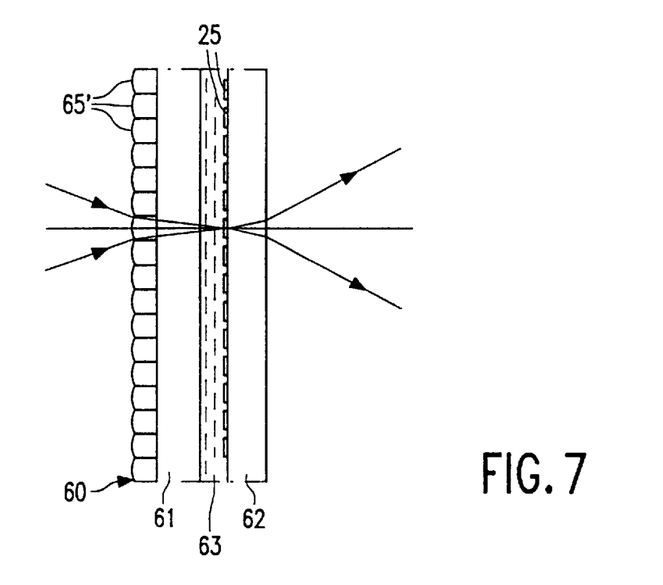

In another embodiment, a different approach is used in which the array of lens elements is disposed instead at the input side of the display panel 22. The arrangement is shown in FIG. 7 which is a cross-sectional view through a part of the panel and lens array assembly. The lens element array 60, which again may be a moulded plastic lenticular sheet, is secured to the outer surface of the substrate 61 and similarly comprises parallel, elongate, lens elements, here referenced 65', extending in the row direction, each overlying and aligned with, a respective pixel row. The lens elements 65' in this case comprise positive cylindrical lenses. The action of these lens elements 65' is to concentrate the input light into the central part of their associated pixels 25. The light is concentrated into a strip centred approximately on the central row-direction axis of the pixels which still fills the width of each pixel area but whose height is less than that of the open part of the pixels, the reduction in height being symmetrical about the centre line of the pixel. For a given row of pixels, therefore, a comparatively narrow band of light at the pixel plane is obtained whose width is less than the height of the pixels and which is centred on the centre line of the pixels. As before, the light output from each pixel row in the panel has increased divergence in the column direction.

Because the lens elements precede the pixels the problem of light going through the "wrong" lens element, causing a confused picture, is avoided. Instead, some light will fall outside the desired central area of the pixel, giving an approximately Gaussian line profile instead of a top-hat profile.

For the aforementioned 3:4 format 2.8 inch diagonal LC panel with a row spacing of 0.15 mm, a substrate 61 having a thickness of around 0.6 mm is again possible.

An additional advantage of this embodiment is that the active switch devices of the active matrix display panel, for example TFTs or TFDs, located at each pixel area can be arranged to lie in a low light intensity region of the pixel, thus reducing problems due to their photo-sensitive behaviour.

As before, the lens elements 65' could be provided as gradient index lenses within the glass substrate 61 or formed by making the substrate 61 from a sandwich of materials with appropriate profiles.

The apparatus may be a full colour projection display apparatus using three separate display panels each operating with a respective one of the three primary colours. An example of such apparatus is illustrated schematically in FIG. 8. Each of the display panels has associated therewith a lens element array either at its output side, as in the FIG. 6 embodiment, or at its input side, as in the FIG. 7 embodiment. In this apparatus, a beam of white light from an illumination unit A is incident on a colour-selective reflector 120, for example a dichroic mirror, which reflects, for example, the blue colour component $b_B$ and passes the rest of the beam. This beam portion reaches a second colour-selective reflector 121 which reflects the green colour component $b_G$ and passes the remaining red colour component $b_R$ to a reflector 122 which reflects the red beam component toward the projection lens unit C. The reflector 122 may be a neutral reflector or a reflector which is optimised for red light. The blue beam component is reflected by a neutral or a blue-selective reflector 123 to an LC display panel 22A with an associated lens element array 60. This panel is driven in known manner so that the blue component of the image to be projected appears on this panel. The beam component modulated with the blue information reaches the projection lens unit C via colour-selective reflector 124, which passes the blue beam component and reflects the green beam component, and a further colour-selective reflector 125 which reflects the blue beam component. The green beam component $b_G$ traverses a second LC display panel 22B with an associated lens array 60 where it is modulated with the green colour component and is then reflected to the projection lens unit C successively by the colour-selective reflectors 124 and 125. The red beam component $b_R$ traverses a third LC display panel 22C with an associated lens array 60 where it is modulated with the red colour component and subsequently reaches the projection lens unit via the colour-selective reflector 125.

Figure 8:
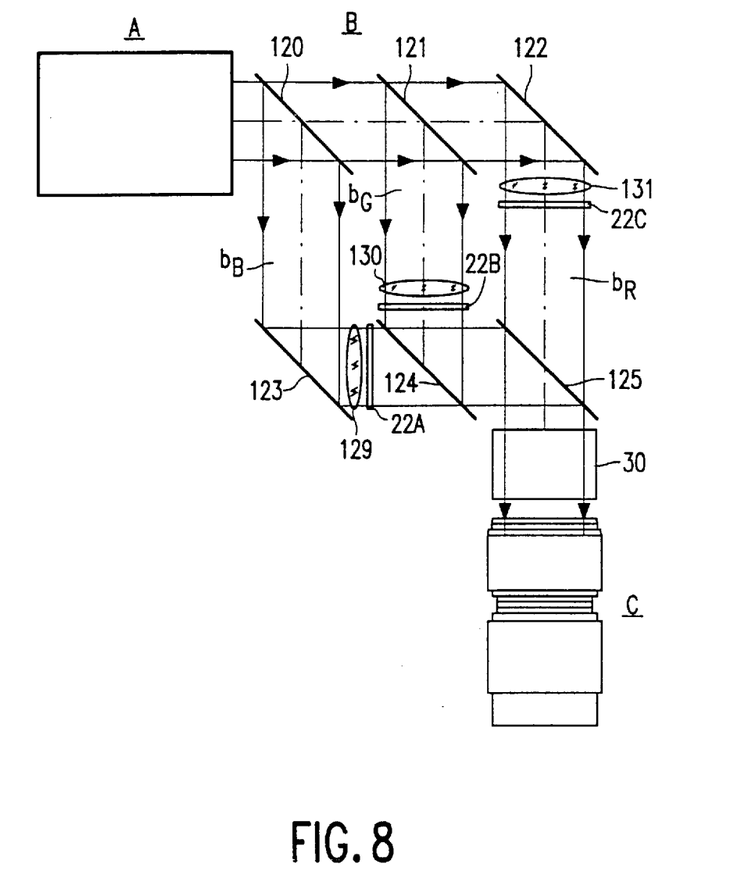
FIG. 8 shows diagrammatically an embodiment of the apparatus using a plurality of display panels for different colours.

The blue, red and green beam components are superimposed at the input aperture of the lens unit, so that a colour image is created at this aperture which is imaged in a magnified form by this unit on the projection screen, (not shown in FIG. 8).

The optical path lengths between the output of the illumination unit A and each display panel 22A, 22B and 22C are preferably equal so that the cross-sections of the red, blue and green beam components are equal at the location of their display panel. Also the optical path lengths between the display panels 22A, 22B and 22C and the input aperture of the projection lens unit are substantially equal so that the differently coloured scenes are satisfactorily superimposed on the projection screen. The lenses 129, 130 and 131 arranged in front of the display panels are field lenses which ensure that all light coming from the exit plane of the illumination unit is concentrated in the entrance pupil of the projection lens unit.

The deflection unit 30, shown as a simple block in FIG. 8, is preferably arranged in the combined light path before the projection lens unit C. Then only one such unit is needed and this unit can be positioned at a suitable distance from the display panels.

With regard to the above-described embodiments, it is envisaged that the lens elements of the array 60 could comprise an individual lens element for each pixel rather than having elongate lens elements of the kind described. The LC display panel, or panels, may comprise twisted nematic, ferroelectric, polymer dispersed or other types of LC materials. It is envisaged, however, that other kinds of light modulating matrix display panels could be used.

In summary, therefore, an image projection apparatus is disclosed which comprises an illumination unit, an image display unit comprising a matrix display panel having a row and column array of pixels, a projection lens for projecting an image produced by the display panel on to a screen and an optical deflection unit arranged between the display unit and the projection lens which is operable selectively to shift the light rays from a row of pixels passing therethrough whereby the pixel row images on the screen in one field are displaced and interlaced with the pixel row images of a preceding field. The image display unit includes an array of lens elements overlying the array of pixels whose effect is to reduce the height of the image of each pixel row in the projected display so the pixel row images of one field can fill the gaps between adjacent pixel row images of a preceding field without any substantial overlap and display panels having high aperture ratio can be utilised.

From reading the present disclosure, other modifications will be apparent to persons skilled in the art. Such modifications may involve other features which are already known in the field of image projection display apparatus and component parts thereof and which may be used instead of or in addition to features already described herein.

I claim:

1. An image projection apparatus comprising an illumination unit, an image display unit having at least one image display panel comprising an array of pixels arranged in rows and columns and operable to produce a display image, a projection lens for projecting the image produced by the display unit on to a projection screen and an optical deflection unit arranged between the display unit and the projection lens, and which switches between two modes in which the light rays from rows of pixels of the display panel and passing through the deflection unit either are or are not shifted so as to displace the projected image of the rows of pixels on the projection screen, characterised in that the image display unit includes an array of lens elements overlying the array of pixels which lens elements are of such a form and arranged with respect to the pixel rows so as to reduce the height of the image of each pixel row in the projected display image.

2. An image projection apparatus according to claim 1, characterised in that the lens elements are operable to reduce the height of the pixel rows such that the height of a pixel row image in the projected display image is approximately half the centre to centre spacing between the images of adjacent pixel rows in the projected display image.

3. An image projection apparatus according to claim 2, characterised in that the lens elements comprise parallel, elongate, lens elements extending in the pixel row direction, each lens element overlying a respective pixel row of the display panel.

4. An image projection apparatus according to claim 3, characterised in that the array of lens elements is provided adjacent to the output side of the display panel and in that the lens elements each comprise a negative lens element and produce a reduced size virtual image of their associated pixels.

5. An image projection apparatus according to claim 4, characterised in that the array of lens elements is provided adjacent to the input side of the display panel and in that the lens elements each comprise a positive lens element and concentrate light through a central region of their associated pixels.

6. An image projection apparatus according to claim 5, characterised in that the array of lens elements comprises a moulded sheet which is disposed over a substrate of the display panel.

7. An image projection apparatus according to claim 6, characterised in that the spacing between adjacent rows of pixels in the display panel is substantially less than the height of the pixels.

8. An image projection apparatus according to claim 7, characterised in that the apparatus includes a plurality of image display units, each operating with a different colour light, whose outputs are combined before being projected by the projection lens, each of which display units includes a said array of lens elements.

9. An image projection apparatus according to claim 1, characterized in that the lens elements comprise parallel, elongate, lens elements extending in the pixel row direction, each lens element overlying a respective pixel row of the display panel.

10. An image projection apparatus according to claim 3, characterized in that the array of lens elements comprises a moulded sheet which is disposed over a substrate of the display panel.

11. An image projection apparatus according to claim 4, characterized in that the array of lens elements comprises a moulded sheet which is disposed over a substrate of the display panel.

* * * * *